(12) United States Patent
Kobuse et al.

(10) Patent No.: US 10,863,101 B2
(45) Date of Patent: Dec. 8, 2020

(54) IMAGE CAPTURING APPARATUS AND METHOD OF CONTROLLING THE SAME

(71) Applicant: CANON KABUSHIKI KAISHA, Tokyo (JP)

(72) Inventors: Takenori Kobuse, Kawasaki (JP); Kenzo Hisa, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/662,430

(22) Filed: Jul. 28, 2017

(65) Prior Publication Data

US 2018/0063401 A1    Mar. 1, 2018

(30) Foreign Application Priority Data

Aug. 26, 2016  (JP) ................. 2016-166010

(51) Int. Cl.
| | | |
|---|---|---|
| *H04N 5/374* | (2011.01) | |
| *H04N 5/235* | (2006.01) | |
| *H04N 9/04* | (2006.01) | |
| *H04N 5/243* | (2006.01) | |
| *H04N 5/3745* | (2011.01) | |
| *H04N 5/359* | (2011.01) | |
| *H04N 5/353* | (2011.01) | |
| *H04N 5/378* | (2011.01) | |

(52) U.S. Cl.
CPC ........... *H04N 5/2353* (2013.01); *H04N 5/243* (2013.01); *H04N 5/3532* (2013.01); *H04N 5/3592* (2013.01); *H04N 5/378* (2013.01); *H04N 5/3745* (2013.01); *H04N 5/37452* (2013.01); *H04N 9/045* (2013.01)

(58) Field of Classification Search
None
See application file for complete search history.

(56) References Cited

U.S. PATENT DOCUMENTS

| | | | |
|---|---|---|---|
| 9,560,285 B2 | 1/2017 | Ichikawa et al. | |
| 2008/0055441 A1 | 3/2008 | Altice | |
| 2009/0284632 A1* | 11/2009 | Onuki | ............... H01L 21/14609 348/302 |

(Continued)

FOREIGN PATENT DOCUMENTS

JP    2015-177349 A    10/2015

OTHER PUBLICATIONS

Jun. 19, 2020 Japanese Official Action in Japanese Patent Appln. No. 2016-166010.

*Primary Examiner* — Twyler L Haskins
*Assistant Examiner* — Wesley J Chiu
(74) *Attorney, Agent, or Firm* — Venable LLP

(57) ABSTRACT

An image capturing apparatus comprises an image sensor in which a plurality of pixels are arranged two-dimensionally, wherein each of the pixels have a photoelectric conversion portion, a holding portion that holds a charge obtained by the photoelectric conversion portion, an amplification portion that outputs a signal based on a charge outputted from the holding portion, a first transfer switch that transfers the charge from the photoelectric conversion portion to the holding portion, and a second transfer switch that transfers the charge from the holding portion to the amplification portion; and a controller that controls a number of times that the first transfer switch is turned on in relation to the second transfer switch being turned on one time.

3 Claims, 12 Drawing Sheets

(56) References Cited

U.S. PATENT DOCUMENTS

| | | | | |
|---|---|---|---|---|
| 2010/0165167 A1* | 7/2010 | Sugiyama | ............ | H04N 5/3597 348/311 |
| 2010/0214439 A1* | 8/2010 | Oshima | .................... | G03B 7/08 348/229.1 |
| 2012/0140985 A1* | 6/2012 | Hattori | .................... | H04N 5/147 382/103 |
| 2012/0213485 A1* | 8/2012 | Matsuyama | ............ | H04N 5/217 386/224 |
| 2013/0215310 A1* | 8/2013 | Toyoguchi | ........ | H01L 27/14806 348/308 |
| 2014/0347538 A1* | 11/2014 | Toda | ................ | H01L 27/14689 348/308 |
| 2015/0062382 A1* | 3/2015 | Cote | .......................... | G06T 5/50 348/239 |
| 2015/0085077 A1* | 3/2015 | Kim | .................... | H04N 5/2353 348/46 |
| 2015/0264243 A1* | 9/2015 | Ichikawa | ............ | H04N 5/37452 348/296 |
| 2017/0118400 A1* | 4/2017 | Hesch | ................ | H04N 5/23216 |
| 2017/0251151 A1* | 8/2017 | Hicks | ................ | H01L 27/14625 |

* cited by examiner

IMAGE CAPTURING APPARATUS AND METHOD OF CONTROLLING THE SAME

BACKGROUND OF THE INVENTION

Field of the Invention

The present invention relates to an image capturing apparatus and a method of controlling the same.

Description of the Related Art

In recent years, CMOS image sensors (hereinafter referred to as CMOS sensors) are mainly used as an image sensor of an image capturing apparatus as typified by a video camera. As driving methods for CMOS sensors, there is a rolling shutter method in which a single frame is generated by sequentially exposing horizontal lines and sequentially reading out video signals for each line, and a global shutter method in which video is read out where the exposure timing of horizontal lines is the same for all lines.

Typically, the global shutter method is advantageous because whereas in the rolling shutter method a rolling shutter distortion in which an exposure time period shifts with each line occurs, in the global shutter method, since exposure is performed simultaneously for all lines, a moving body is captured without a rolling shutter distortion occurring.

It is necessary to arrange a holding portion for holding a charge in addition to a photoelectric conversion portion in order to realize the global shutter method. However, compared to the rolling shutter method, the area of the photoelectric conversion portion becomes relatively smaller due to arranging the holding portion, and a saturated charge amount that one pixel can handle becomes small.

In Japanese Patent Laid-Open No. 2015-177349, a method for magnifying a saturated charge amount by transferring charges to a charge holding portion from a photoelectric conversion portion a plurality of times while transferring a charge from the charge holding portion to amplification portion is recited.

However, the following problem exists in a case where an image capture method, such as transferring a charge a plurality of times from the photoelectric conversion portion to a charge holding portion while transferring a charge from the charge holding portion to an amplification portion, is performed. Specifically, there is a possibility that a read out speed (hereinafter referred to as a frame rate) of a video signal of one frame will be reduced and color balance of an image will be ruined in a case where a bright subject at a moment of a flash or the like occurs.

SUMMARY OF THE INVENTION

The present invention was conceived in view of the above described issues and suppresses an image degradation accompanying a magnification of a saturated charge amount in an image capturing apparatus equipped with an image sensor having a relatively small photoelectric conversion portion area due to arrangement of a charge holding portion on each pixel.

According to a first aspect of the present invention, there is provided an image capturing apparatus comprising: an image sensor in which a plurality of pixels are arranged two-dimensionally, wherein each of the pixels have a photoelectric conversion portion that converts incident light into a charge, a holding portion that holds a charge obtained by the photoelectric conversion portion, an amplification portion that outputs a signal based on a charge outputted from the holding portion, a first transfer switch that transfers the charge from the photoelectric conversion portion to the holding portion, and a second transfer switch that transfers the charge from the holding portion to the amplification portion; and a controller that, in accordance with an image capturing condition or a processing condition, controls a number of times that the first transfer switch is turned ON or a time period in which the first transfer switch is ON in relation to the second transfer switch being turned on one time.

According to a second aspect of the present invention, there is provided a method of controlling an image capturing apparatus comprising an image sensor in which a plurality of pixels are arranged two-dimensionally, wherein each of the pixels have a photoelectric conversion portion that converts incident light into a charge, a holding portion that holds a charge obtained by the photoelectric conversion portion, an amplification portion that outputs a signal based on a charge outputted from the holding portion, a first transfer switch that transfers the charge from the photoelectric conversion portion to the holding portion, and a second transfer switch that transfers the charge from the holding portion to the amplification portion, the method comprising: in accordance with an image capturing condition or a processing condition, controlling a number of times that the first transfer switch is turned on or a time period in which the first transfer switch is ON in relation to the second transfer switch being turned on one time.

Further features of the present invention will become apparent from the following description of exemplary embodiments with reference to the attached drawings.

DESCRIPTION OF THE EMBODIMENTS

Hereinafter, referring to the attached drawings, embodiments of the present invention will be described in detail.

First Embodiment

Figure 1:
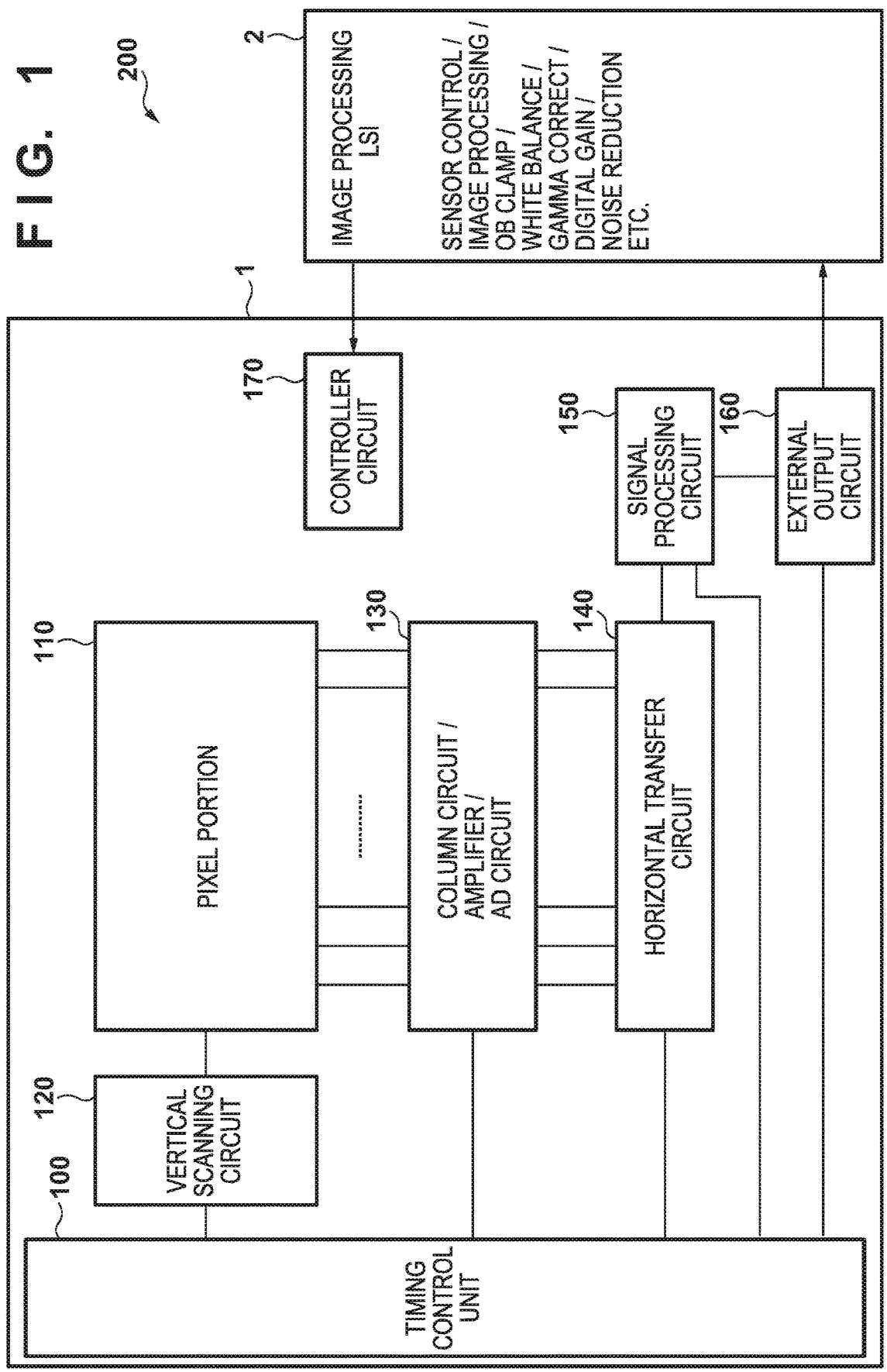
FIG. 1 is a view illustrating a configuration of an image capturing apparatus according to the first embodiment of the present invention.

FIG. 1 is a view illustrating a block configuration of an image capturing apparatus 200 according to the first embodiment of the present invention. In FIG. 1, the image capturing apparatus 200 has an image sensor 1, which is a CMOS type image sensor which implements a parallel type AD converter, and an image processing LSI 2. The image processing LSI 2 performs development processing such as white balance control processing or gamma correction processing on image data that the image sensor 1 outputs, and ultimately outputs the development processed image data to a monitor or records it to a recording medium. The image processing LSI 2 has an integrated CPU, and communicates (serial communication for example) with the image sensor 1 in accordance with an operation mode of the image capturing apparatus 200 and performs control by this CPU.

The image sensor 1 has a timing control unit 100, a pixel portion 110, a vertical scanning circuit 120, a column circuit 130, a horizontal transfer circuit 140, a signal processing circuit 150, an external output circuit 160, and a controller circuit 170. The controller circuit 170 is an interface (I/F) unit that interfaces with the image processing LSI 2, and the controller circuit 170 uses serial communication or the like, and receives control from the CPU of the image processing LSI 2 to the image sensor 1.

The timing control unit 100 controls operation by supplying an operating clock (CLK) to each block of the image sensor 1 and supplying a timing signal to each block. The pixel portion 110 has a large number of pixels which perform a photoelectric conversion in accordance with a quantity of incident light and output a voltage signal. Each pixel has a photoelectric conversion element (photodiode), and a color filter and a microlens are implemented in the surface of the photodiode. Color filters of the three colors of R (red), G (green), and B (blue) are used and arrangement is such that a so-called RGB primary color filter Bayer arrangement is cyclical. However, limitation is not made to a Bayer arrangement. Note, description is given later using FIG. 2 regarding the configuration of the pixel portion 110 in the image sensor 1 of the present embodiment.

The vertical scanning circuit 120 performs control of timing for sequentially reading out a pixel signal voltage that the pixel portion 110, which is two-dimensionally arranged, generated in one frame. Generally, video signals are sequentially read out for each row from a top row to a bottom row of the pixel portion 110 within one frame. The column circuit 130 is equipped with an amplifier for electrically amplifying a signal read from the pixel portion 110 for each line and an AD conversion circuit which performs analog-to-digital conversion of the signal.

The horizontal transfer circuit 140 is a circuit for transferring the pixel signal outputted from the column circuit 130 in a horizontal direction. Output of the horizontal transfer circuit 140 is inputted to the signal processing circuit 150. The signal processing circuit 150 is a circuit which digitally performs signal processing and performs a simple gain calculation by performing a shifting computation or a multiplication in addition to adding the offset value of a fixed amount by digital processing. Also, by arranging an intentionally shielded pixel area in the pixel portion 110, a digital black level clamp operation which uses this may also be performed.

The output data of the signal processing circuit 150 is inputted to the external output circuit 160. The external output circuit 160 has a serializer function and converts a parallel signal of many bits inputted from the signal processing circuit 150 into a serial signal. Also, this serial signal is converted into an LVDS signal for example, and is outputted to an external device (the image processing LSI 2 in the case of the present embodiment).

Figure 2:
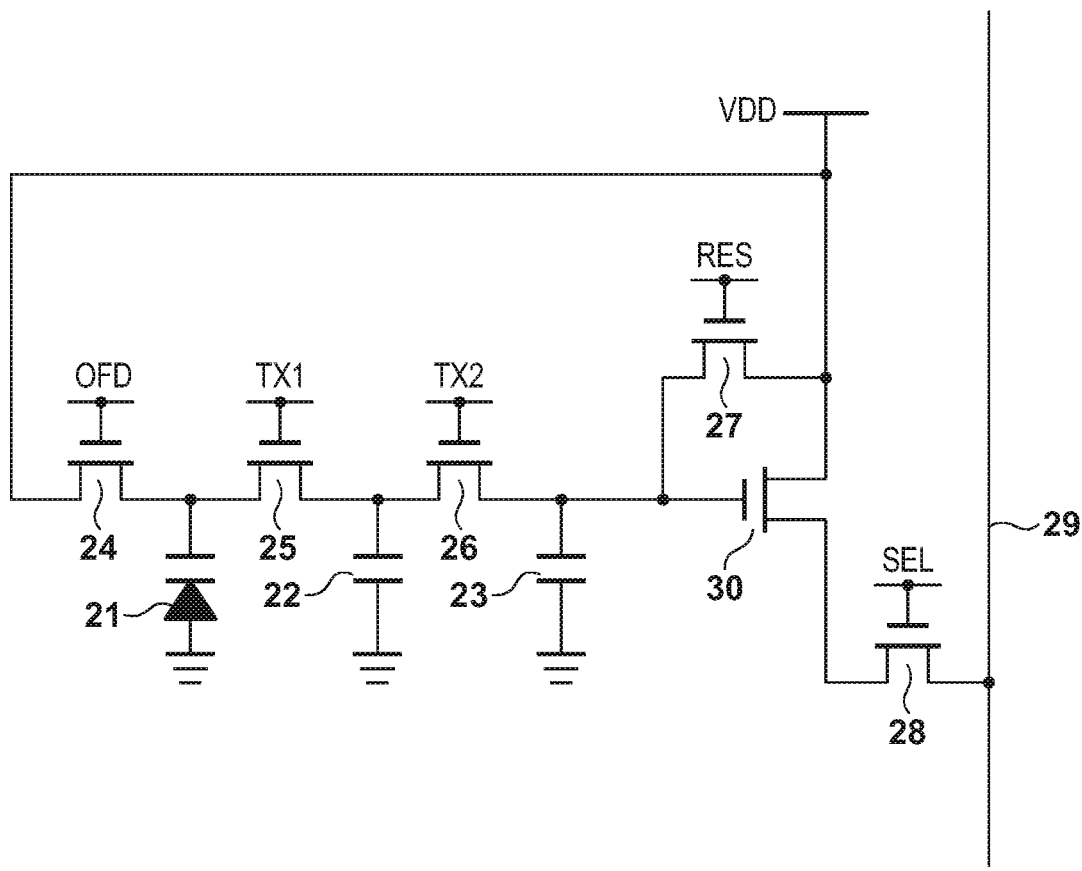
FIG. 2 is a view illustrating a configuration of a pixel of an image sensor.

FIG. 2 is a view illustrating a configuration of each pixel arranged in the pixel portion 110 in FIG. 1. A photoelectric conversion unit 21 accumulates signal charge that occurs from incident light. A first transfer switch 25 is controlled by a control signal TX1 and transfers the signal charge accumulated in the photoelectric conversion unit 21 to a holding portion 22. A second transfer switch 26 is controlled by a control signal TX2 and transfers a signal charge held in the holding portion 22 to a floating diffusion (FD) 23 which is an input node of an amplification portion 30. The amplification portion 30 amplifies and outputs a voltage signal based on the signal charge amount of the FD 23.

A reset transistor 27 is controlled by a control signal RES and resets the signal charge of the FD 23. A selection transistor 28 for pixel selection controlled by a control signal SEL outputs a voltage signal amplified by the amplification portion 30 to a column output line 29. Note, an overflow drain transistor (OFD transistor) 24 controlled by a control signal OFD is a transistor which resets an unnecessary charge of the photoelectric conversion unit 21. In the present embodiment, by arranging the holding portion 22, it is possible to accumulate a signal charge until a signal is outputted to the column output line 29 and the photoelectric conversion unit 21 can accumulate additional signal charge in this period. For this reason, a global shutter operation of a simultaneous accumulation of all pixels is possible.

Figure 3A:
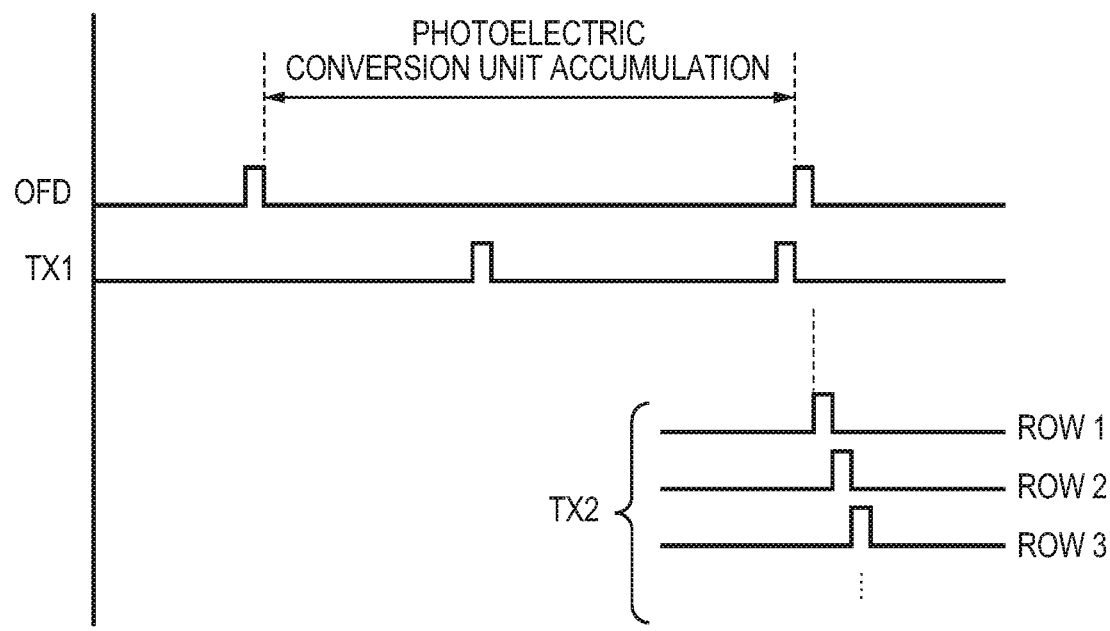
FIGS. 3A and 3B are views illustrating an operation timing of a transfer switch.
Figure 3B:
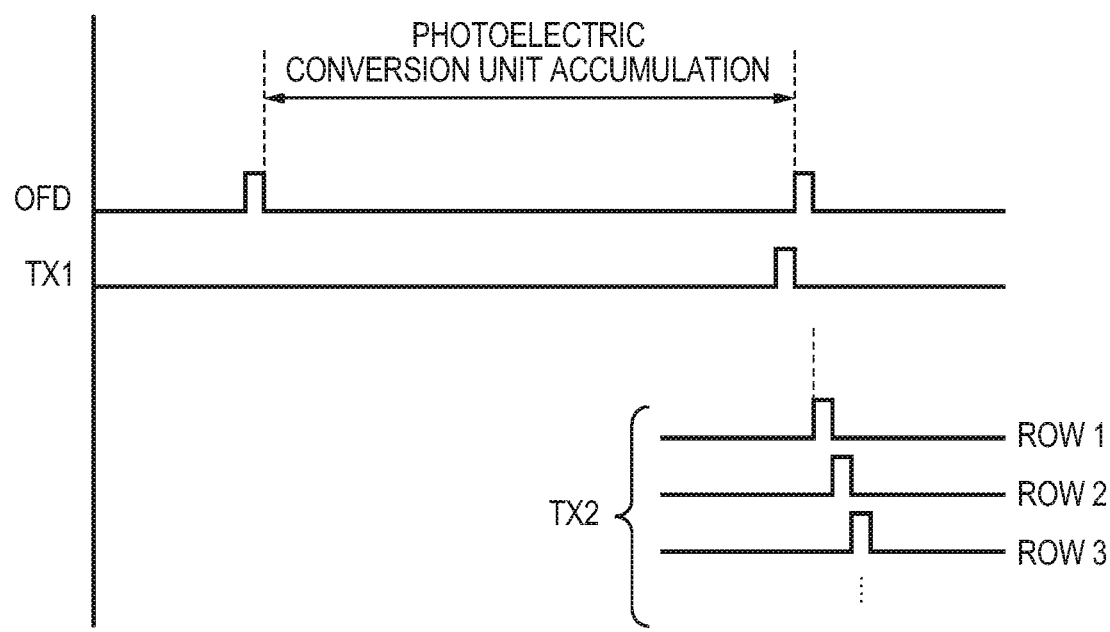

FIGS. 3A and 3B are timing charts illustrating the overflow drain controlled by control signal OFD and timing of turning on and turning off the first and the second transfer switches 25 and 26 controlled by the control signals TX1 and TX2.

After an unnecessary charge of the photoelectric conversion unit 21 is discharged from an overflow drain by the control signal OFD becoming high-level, an accumulation of signal charge to the photoelectric conversion unit 21 is started by making the control signal OFD a low level. One or more times prior to accumulation of the photoelectric conversion unit 21 finishing, the control signal TX1 becomes high-level and the signal charge of the photoelectric conversion unit 21 is transferred to the holding portion 22.

FIG. 3A is a view describing a situation in which a transfer of a signal charge from the photoelectric conversion unit 21 to the holding portion 22 is performed twice during the accumulation period (a period from when the control signal OFD becomes a low level to when it subsequently becomes high-level) of the photoelectric conversion unit 21. Though the signal charge amount that can be accumulated in the photoelectric conversion unit 21 is less than the signal charge amount that can be accumulated in the holding portion 22, it is possible to accumulate a signal charge until a charge saturation amount of the holding portion 22 is reached by performing a transfer of a signal charge a plurality of times. Meanwhile, FIG. 3B illustrates a situation in which a transfer of a signal charge from the photoelectric conversion unit 21 to the holding portion 22 is performed only once during an accumulation period of the photoelectric conversion unit 21, and in such a case, it is only possible to accumulate signal charge in the holding portion 22 to the saturated charge amount of the photoelectric conversion unit 21. The signal charge transferred to the holding portion 22 is converted into a voltage signal by being transferred to the FD 23 by the control signal TX2 becoming high-level, and is sequentially outputted for each row to the column output line 29 by the selection transistor 28.

Figure 4A:
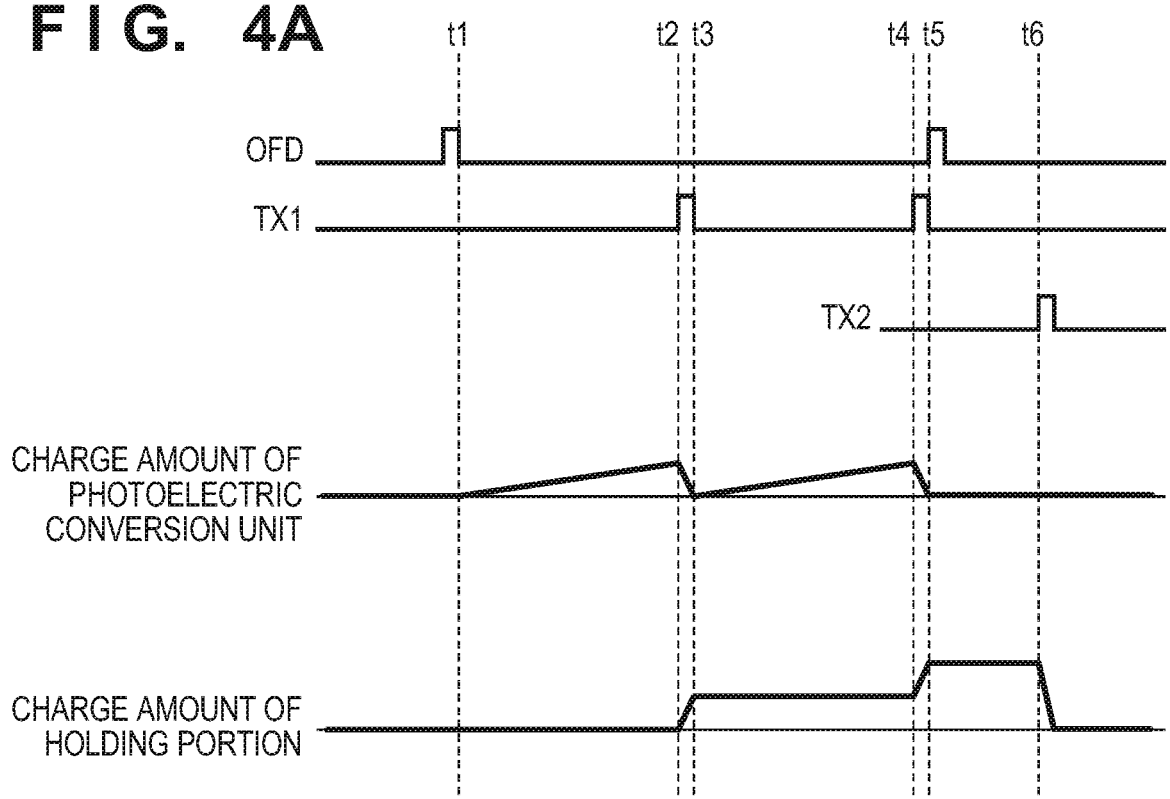
FIGS. 4A and 4B are views illustrating an operation of a transfer switch and a transition of a charge amount.
Figure 4B:
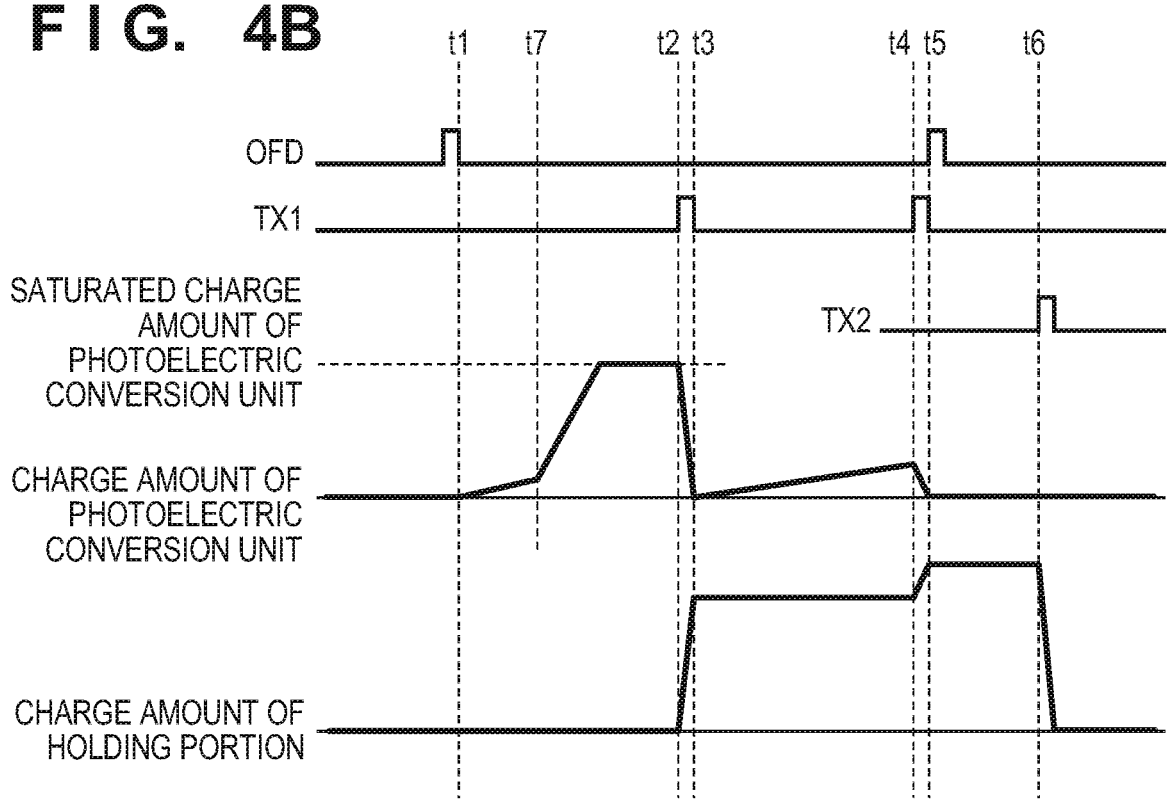

FIGS. 4A and 4B are views describing an example of a transition of a charge amount of the photoelectric conversion unit 21 and a charge amount of the holding portion 22 in a case where a transfer of signal charge to the holding portion 22 is performed twice during a charge accumulation period of the photoelectric conversion unit 21 described above.

FIG. 4A is a view illustrating a transition of a charge in a case where a charge amount of the photoelectric conversion portion does not reach a saturated charge amount according to the brightness of the subject. The photoelectric conversion unit 21 performs a first exposure (accumulation of signal charge) from the time t1 when the control signal OFD becomes the low level until time t2 when a transfer of a first charge to the holding portion 22 starts. From the time t2 to time t3, the first transfer switch is ON because the control signal TX1 is high-level, and so a transfer of the signal charge from the photoelectric conversion unit 21 to the holding portion 22 is performed. From the time t3 to t4, a second exposure (accumulation of signal charges) is performed by the photoelectric conversion unit 21. From the time t4 to time t5, a first transfer switch 25 is ON again because the control signal TX1 is high-level, and so a transfer of the signal charge from the photoelectric conversion unit 21 to the holding portion 22 is performed. After the signal charge is transferred to the holding portion 22, to reset the signal charge of the photoelectric conversion unit 21, the control signal OFD is made to be high-level until a time when the next charge accumulation starts. A time at which the control signal OFD is made to be high-level differs depending on the accumulation time period that is set. A second signal charge transferred from the photoelectric conversion unit 21 is accumulated in the holding portion 22 and the signal charge is held until a time t6 when the transfer to the FD 23 is performed. Then, a second transfer switch 26 is turned on by the control signal TX2 being made to be high-level at the time t6, and the signal charge of the holding portion 22 is transferred to the FD 23.

Although driving in FIG. 4B is the same as in FIG. 4A, FIG. 4B illustrates a case where a bright light such as a flash occurs at time t7 in a sufficiently short period of light emission in relation to the exposure time period. In such a case, at time t7, charge is accumulated up until the saturated charge amount of the photoelectric conversion portion. The saturated charge amount of the photoelectric conversion unit 21 is accumulated in the holding portion 22 by the first transfer from the time t2 to the time t3. If a flash does not occur during the next exposure of the photoelectric conversion unit 21, a charge in proportion to normal brightness of the subject accumulates.

In such a case, in the second exposure in which the flash does not occur, an amount of light in accordance with the color of the subject is incident via the R, G, and B color filters arranged in the pixel portion and the accumulated charge amount differs for each color. However, in the first exposure, due to the flash the saturated charge amount of the photoelectric conversion unit 21 is accumulated for all of colors (R, G, and B) and the accumulated charge amount is the same for each color. For this reason, a balance of the total charge amount of the two times transferred to the holding portion 22 is different than the color balance of the actual subject, which results in an image degradation. In contrast to this, in a case in which a transfer of charge to the holding portion 22 is performed only once during a signal charge accumulation period of the photoelectric conversion unit 21 as illustrated in FIG. 3B, this problem does not occur.

Figure 5A:
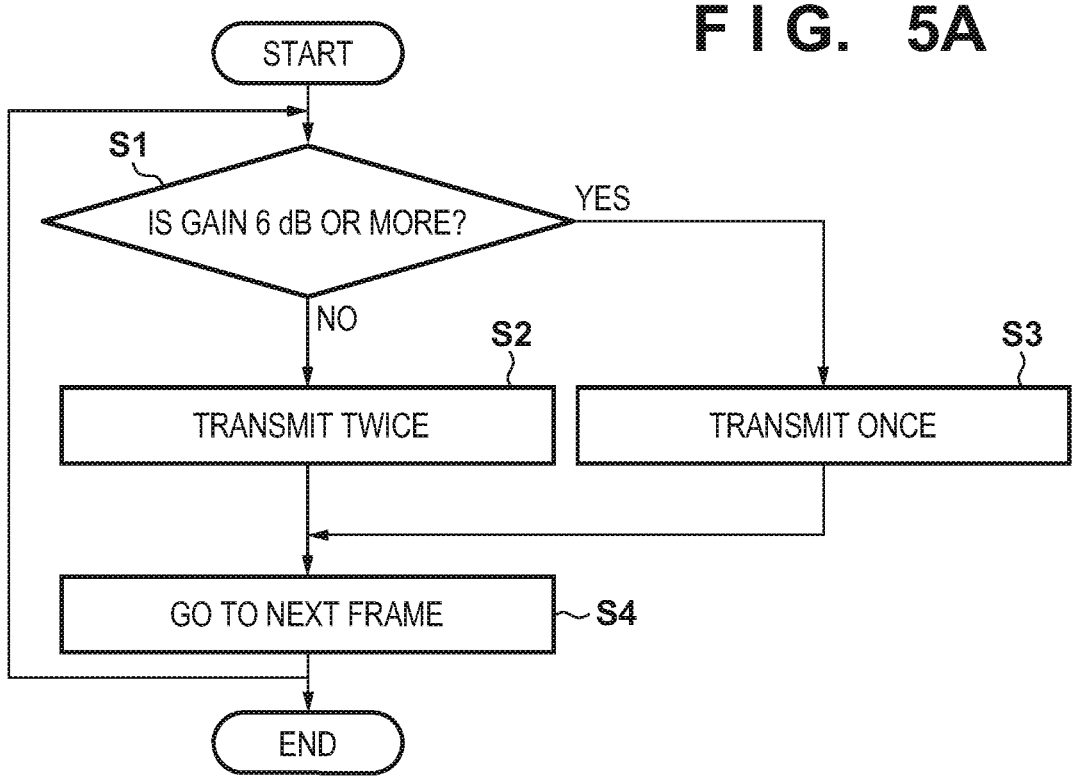
FIGS. 5A and 5B are flowcharts illustrating an operation of the image capturing apparatus of the first embodiment.
Figure 5B:
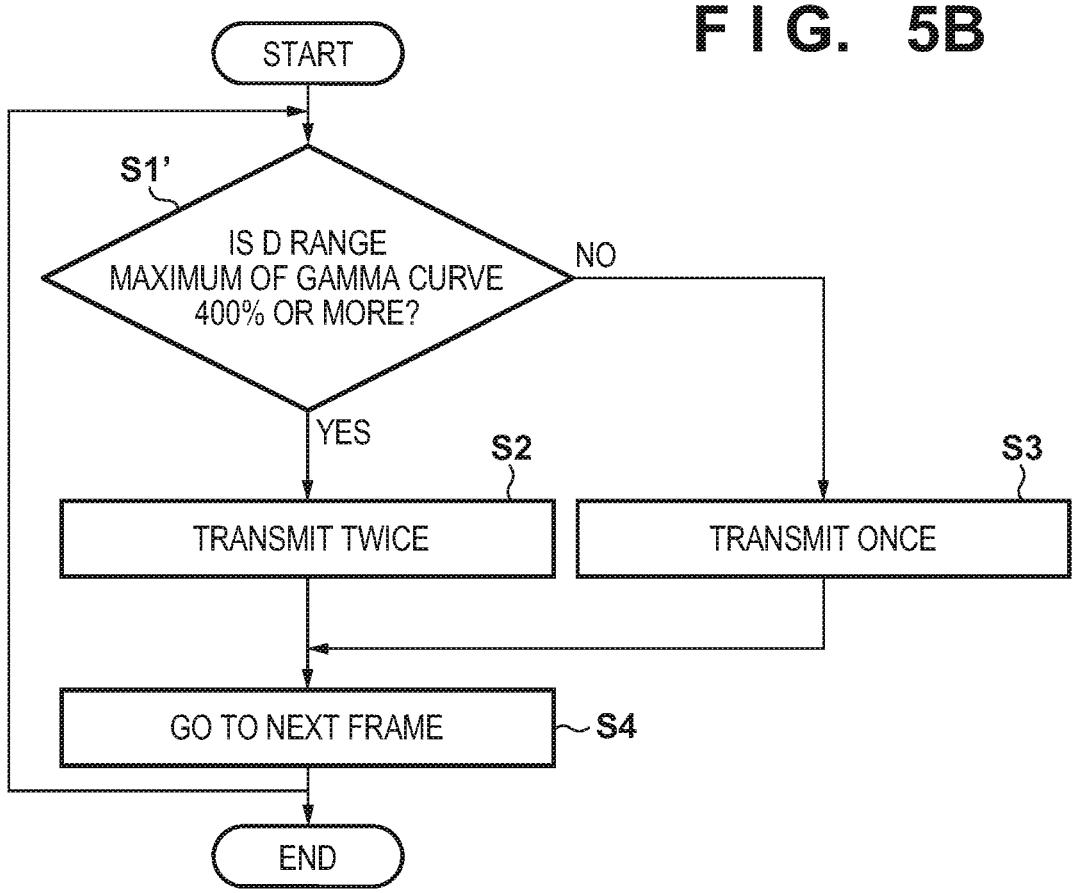

Accordingly, in the present embodiment, a number of times of a signal charge transfer to the holding portion 22 during the accumulation period of the photoelectric conversion unit 21 is controlled in accordance with a setting condition of the image capturing apparatus. FIGS. 5A and 5B are flowcharts illustrating operation of the image capturing apparatus of the present embodiment.

FIG. 5A illustrates an example in which a number of times of a signal charge transfer from the photoelectric conversion unit 21 to the holding portion 22 is switched in accordance with a gain setting (ISO sensitivity setting) of a signal amplification unit of the image capturing apparatus. Firstly, it is determined whether or not the gain of the image capturing apparatus is two or more times the minimum gain (greater than or equal to 6 db) in step S1. In step S1, if it is determined that the gain is less than two-times the minimum gain, the processing proceeds to step S2, and a charge transfer to the holding portion 22 from the photoelectric conversion unit 21 is performed two times. Meanwhile, if it is determined that the gain is two-times or more, the processing proceeds to step S3, and a charge transfer to the holding portion 22 from the photoelectric conversion unit 21 is made to be one time. Then in step S4, an exposure of the next frame is advanced to, and steps S1 to S4 are repeated until capturing stops.

In this way, if the gain setting is two or more times the minimum gain, even if the charge of the saturated charge amount of the photoelectric conversion unit 21 is transferred only one time, it is possible to get the signal amount by the gain of the signal amplification unit in the subsequent stage, so control is taken so that a charge transfer is performed only one time. Also, in a case where the gain setting is less than two-times the minimum gain, it is not possible to get the signal amount by the gain of the signal amplification unit in the subsequent stage, so control is taken so that a charge transfer is performed two times.

And FIG. 5B describes an example in which a number of times of a signal charge transfer from the photoelectric conversion unit 21 to the holding portion 22 is switched in accordance with an upper-limit value of a dynamic range of a gamma correction input unit of the image capturing apparatus. Specifically, a charge transfer is performed two times in a case where the upper-limit value of a dynamic range of a gamma curve is greater than or equal to 400% and a charge transfer is made to be performed one time in a case where it is less than 400%. Other operations are the same as in the case of FIG. 5A.

In this way, in a case where the upper-limit value of the dynamic range of the gamma curve is small, control is taken so that a charge transfer is performed only one time because the influence that the flash has on the image quality becomes large. In a case where the upper-limit value of the dynamic range of the gamma curve is large, control is taken so that a charge transfer is performed twice because influence that the flash has on the image quality is small.

Figure 6:
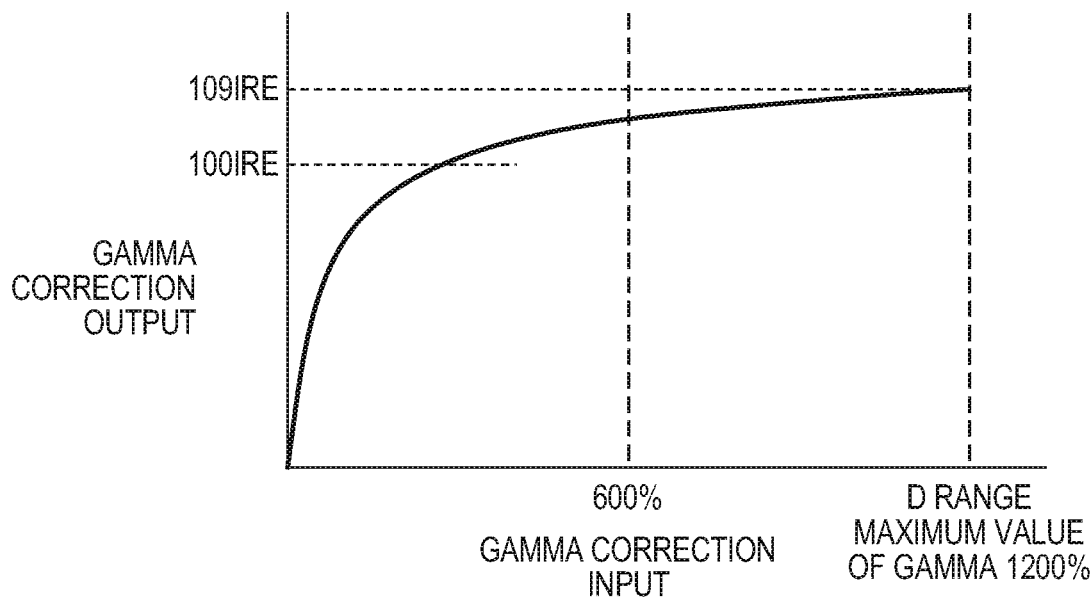
FIG. 6 is a view illustrating an example of a gamma correction in the first embodiment.

FIG. 6 illustrates an example of a gamma curve in case where the upper-limit value of the dynamic range of a gamma correction input is 1200%. In a case where, the saturated charge amount of the photoelectric conversion unit 21 accumulates in the first exposure period out of the two charge transfers due to a flash, the input signal is approximately 600% of the gamma correction input. Because an output at such a time becomes greater than or equal to 100 IRE and is substantially white, even if the color balance deteriorates it is not so noticeable. Note, the number of times of transfer may be selected based on both the gain and the gamma curve, combining FIG. 5A and FIG. 5B.

As described above, it is possible to prevent image degradation at the time of an occurrence of a flash by switching the number of times of charge transfers to the holding portion performed during the accumulation period of the photoelectric conversion portion in accordance with a setting of the image capturing apparatus by virtue of the present embodiment.

Note, the gain setting and the gamma setting are described as settings of the image capturing apparatus in the present embodiment. However, the number of times of transfers of charges may be switched in accordance with a parameter setting of a noise reduction, a knee setting, a white balance setting, or the like in addition to the gain setting and the gamma setting. Also, in a case where a high luminance object subject moves at a high speed, a condition in which the number of times of transfer is switched to a transfer of one time, for example, may be changed depending on a setting of the image capturing apparatus and a subject detection condition.

Second Embodiment

Although in the first embodiment the number of times of a charge transfer to the holding portion 22 performed during the charge accumulation period of the photoelectric conversion unit 21 is switched in accordance with a setting of the image capturing apparatus, it is possible to change an ON time period of the transfer from the photoelectric conversion unit 21 to the holding portion 22 in addition to changing the number of times of transfer. Description is given regarding this method using FIG. 7.

Figure 7:
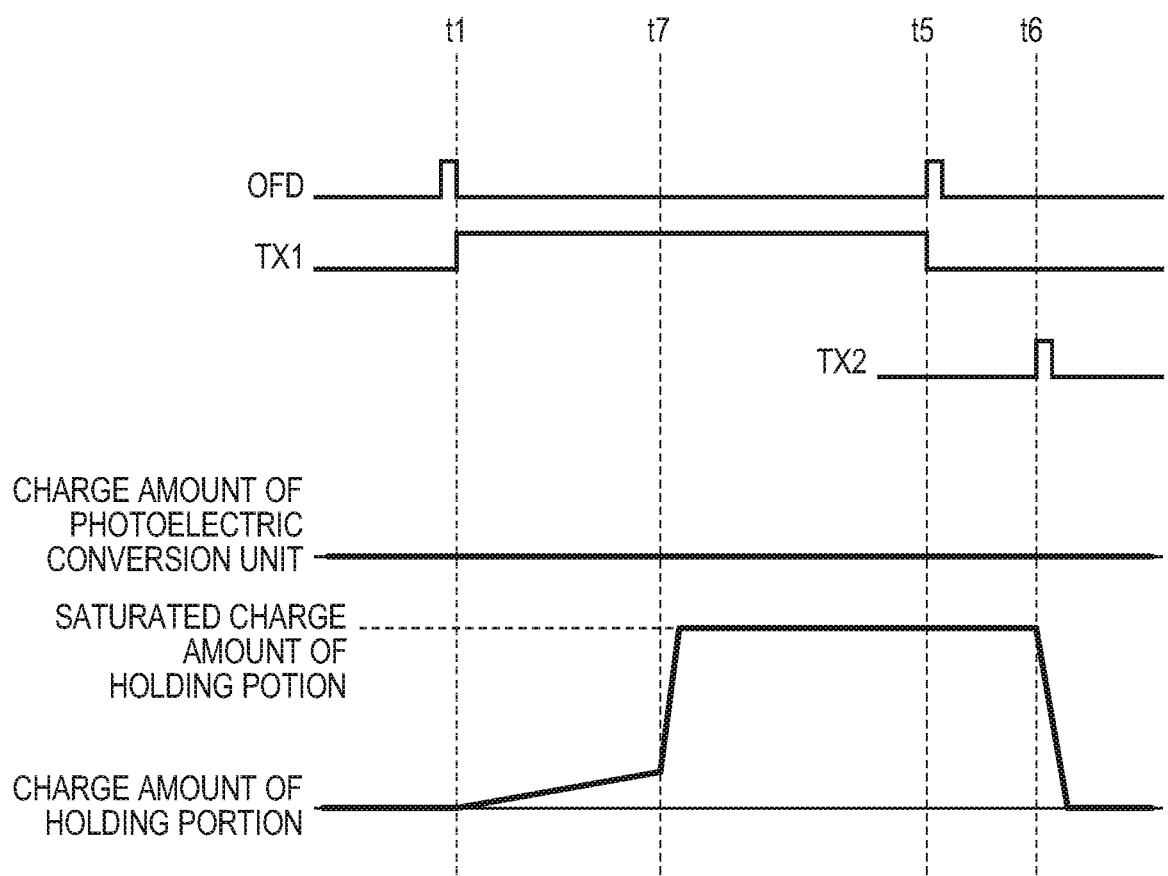
FIG. 7 is a view illustrating an operation of a transfer switch and a transition of a charge amount and in the second embodiment.

FIG. 7 is a view illustrating an example of a transition of a charge amount of the photoelectric conversion unit 21 and a charge amount of the holding portion 22 when a charge transfer to the holding portion 22 is continued over the charge accumulation period of the photoelectric conversion unit 21. At the same time that the control signal OFD at time t1 becomes a low level and a charge accumulation of the photoelectric conversion unit 21 starts, the control signal TX1 is made to be high-level to start the charge transfer to the holding portion 22. The charge transfer to the holding portion 22 continues until time t5. For this reason, a charge is not accumulated in the photoelectric conversion unit 21 and charge is directly accumulated in the holding portion 22.

In a case where a flash occurs at time t7, a charge is accumulated until the saturated charge amount of the holding portion 22 because charge is directly accumulated in the holding portion 22. For this reason, although the color balance deteriorates, all of the colors R, G, and B become saturated and are video outputted as blown-out highlight portions. The holding portion 22 holds a charge until the time t6 when the charge is transferred to the FD 23, the control signal TX2 becomes high-level when at the time t6, and the charge is transferred from the holding portion 22 to the FD 23.

By such a transfer method, it is possible to prevent image degradation because it is possible to cause the charge of the holding portion to accumulate until the saturated charge amount when a flash occurs.

Third Embodiment

In the third embodiment, description is given regarding a control of a clip circuit in the column output line. As described above, the cause of the color balance deteriorating due to a flash when a plurality of exposures are performed is that the saturated charge amount of the photoelectric conversion portion is accumulated for each of the signal charges of R, G, and B in one of the exposure periods and the total charge amount transferred deviates from the actual color balance.

Figure 8:
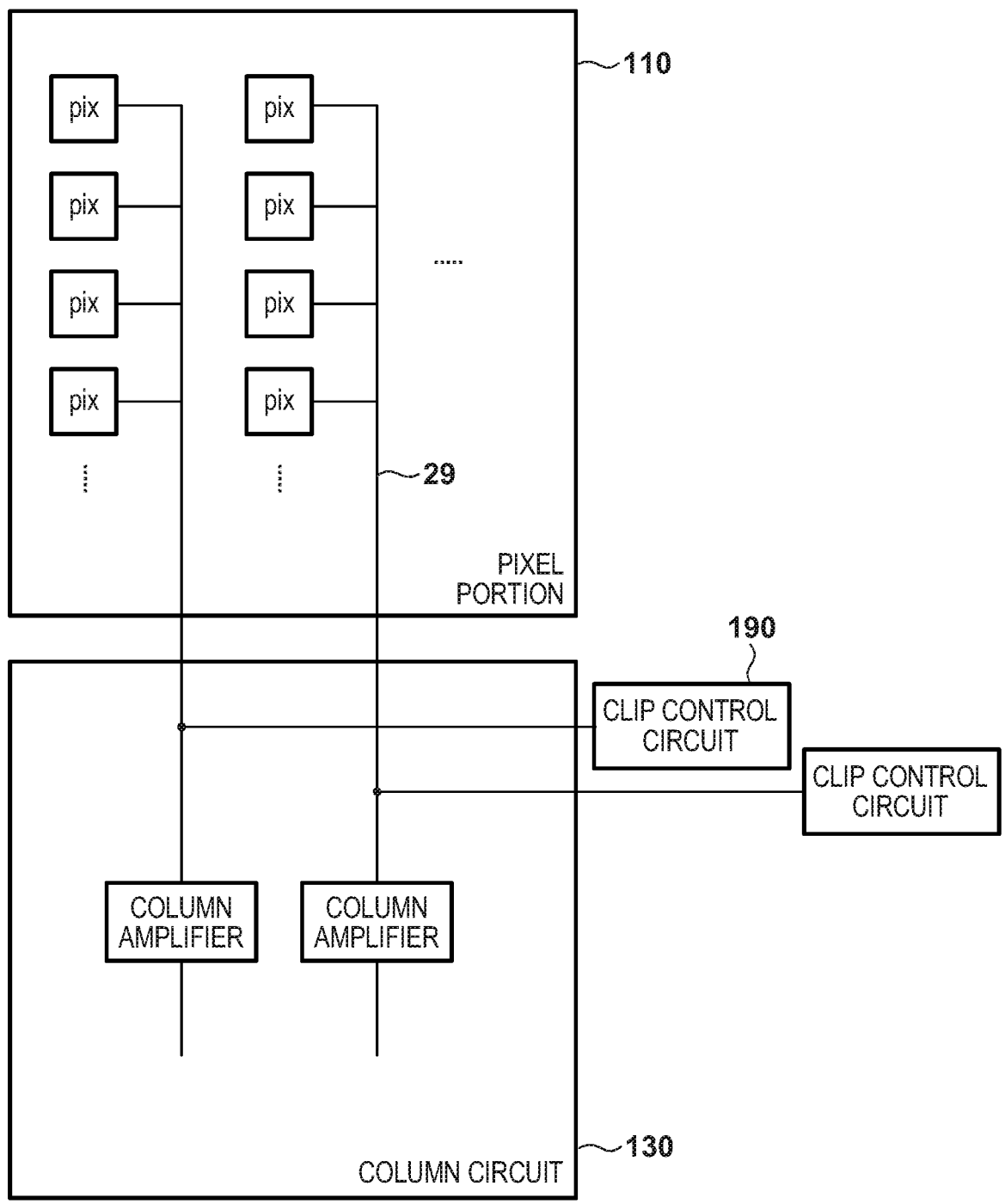
FIG. 8 is a configuration diagram of a column circuit of a case in which a clip circuit is arranged in a column output line.

FIG. 8 is a configuration diagram of a case where a clip control circuit 190 is arranged on the column output line 29 for outputting a signal from the pixel portion 110 to the column circuit 130. The clip control circuit 190 is a circuit for clipping the voltage level of the column output line 29 at a certain level (such that it is not less than or equal to a predetermined value). The signal is amplified by a column amplifier gain within the column circuit 130 and a digital gain and a white balance gain of an image processing unit, but in proportion to the amplification, the saturated charge amount of the holding portion, even if small, becomes saturated at a maximum value of the image processing unit.

Figure 9:
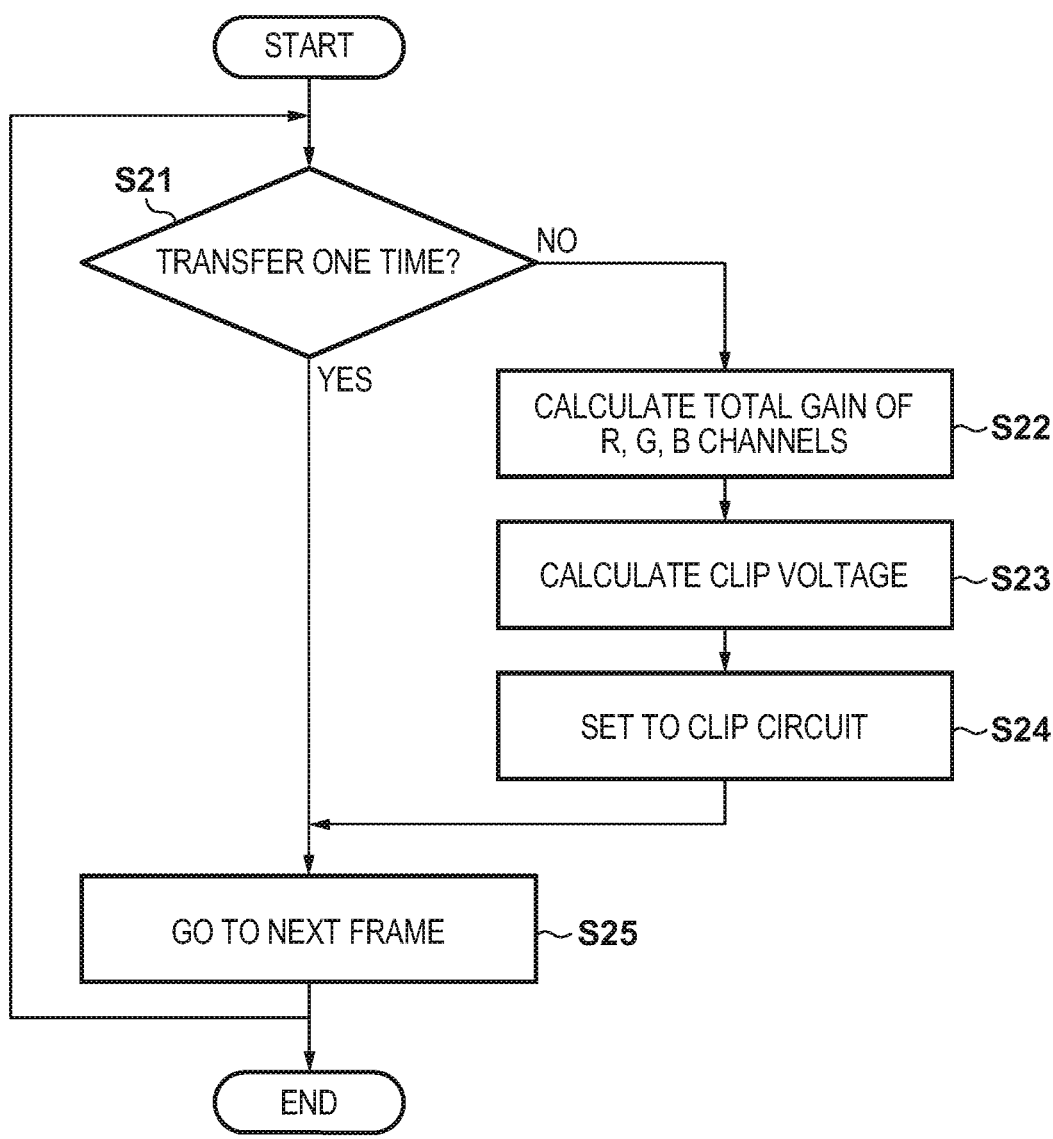
FIG. 9 is a flowchart illustrating an operation of the image capturing apparatus of a third embodiment.

FIG. 9 is a flowchart illustrating an operation in the present embodiment. Firstly, it is determined in step S21 whether or not the number of times of transfer of charge set in the image capturing apparatus is one time, and in a case where the number of times of transfer is one time, step S25 is advanced to. Also, in a case where the number of times of transfer is set to a plurality of times, the gain value applied to the circuit of each channel (color plane) of R, G, and B is calculated in step S22. Here, the gain value is an analog gain or a digital gain of a column amplifier, or the like, of the image sensor 1, a digital gain or a white balance gain of the image processing unit, or the like. The total gain of these are calculated.

When the total gain is calculated, the clip voltage value is determined in step S23. Then, this clip voltage is set to the clip circuit in step S24. For example, in a case where the total gain is times-two for the R and B channels and times-one for the G channel, the clip voltage is controlled so that the voltage value of R and B channels is clipped at ½ with respect to the voltage value of the G channel outputted to the column output line 29. By performing such a control, the color balance of the R, G, and B channels after application of the total gain will cease to deteriorate, and image degradation can be suppressed.

Note, in a case where it is possible to accumulate the saturated charge amount of the holding portion in two transfers, it is possible to use a method in which the clip voltage is controlled after switching the number of times of transfer of a charge to one time in a case where the result of calculating the total gain is a gain of two-times or more.

Fourth Embodiment

In the fourth embodiment, description regarding the configuration of the image capturing apparatus and the configuration of each pixel is omitted because they are the same as the configurations of the first embodiment illustrated in FIG. 1 and FIG. 2.

Figure 10A:
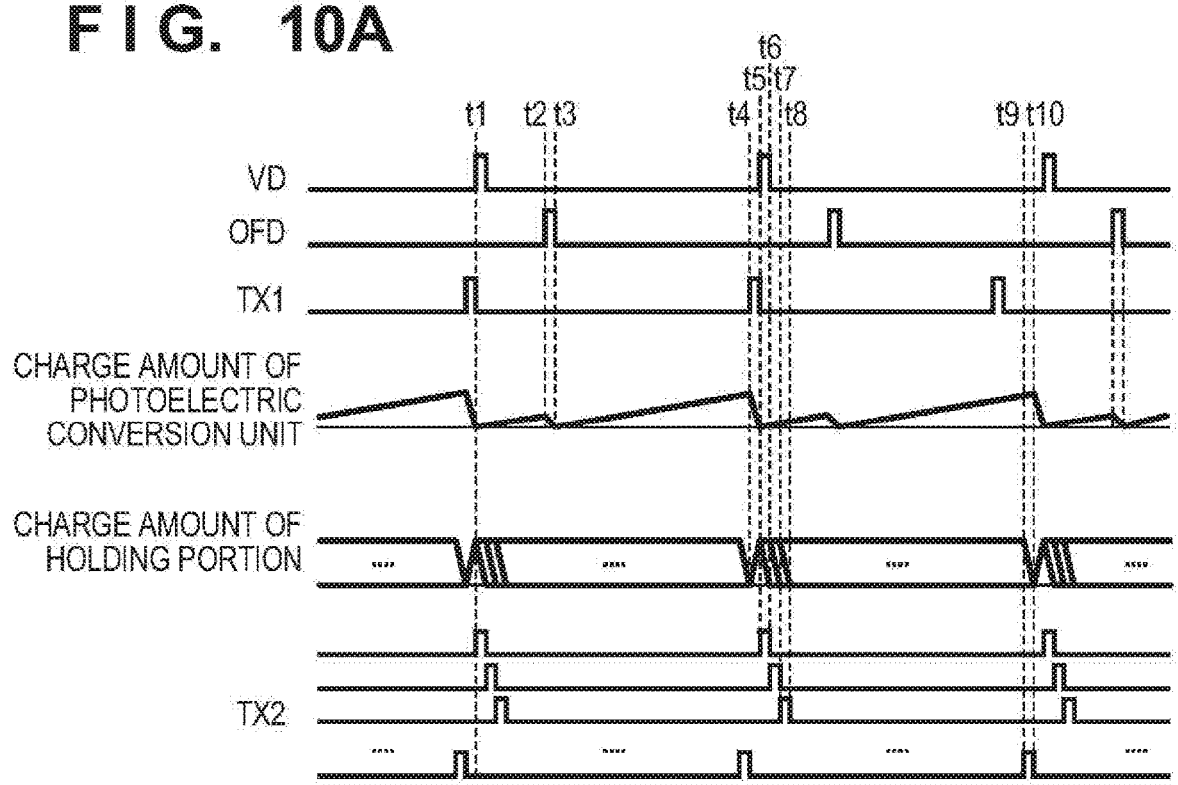
FIGS. 10A and 10B are views illustrating an operation of a transfer switch and a transition of a charge amount and in a fourth embodiment.
Figure 10B:
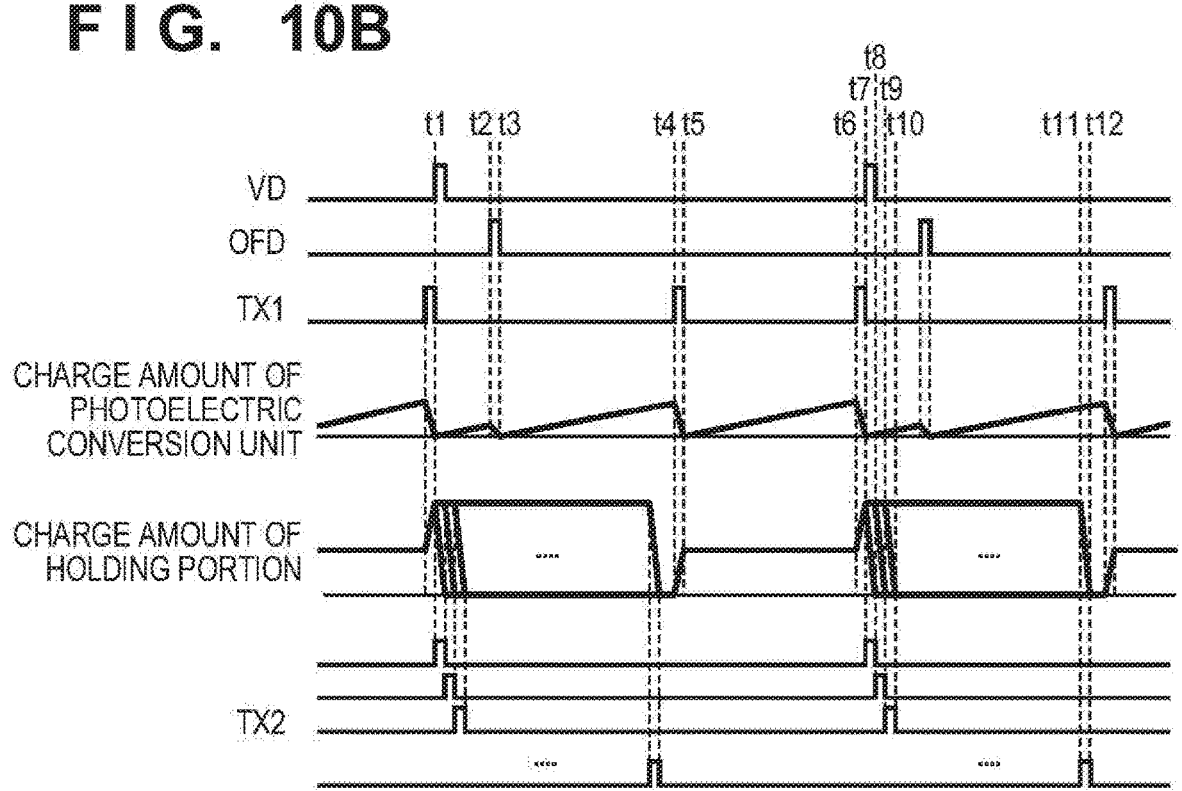

FIGS. 10A and 10B are views illustrating examples of a transition of a charge amount of the photoelectric conversion unit 21 and a charge amount of the holding portion 22 in case where a transfer of a charge to the holding portion 22 is performed in a charge accumulation period of the photoelectric conversion unit 21 in the fourth embodiment.

FIGS. 10A and 10B illustrate examples in which a subject whose pixels are all the same brightness is captured. The charge amount of the photoelectric conversion unit 21 and the charge amount of the holding portion 22 represent information of all pixels. The charge amounts of the photoelectric conversion unit 21 and the holding portion 22 are the same in each pixel because the subject is the same brightness. A timing of a transfer of a charge from the photoelectric conversion unit 21 to the holding portion 22 is the same in each pixel. A timing of transfer to the FD 23 differs depending on the pixel. Note, if the brightness of the subject differs between pixels, the height direction of the graph is different for every pixel because the charge amount of the photoelectric conversion unit 21 is different in each pixel.

FIG. 10A is a view illustrating an example of a transition of a charge amount of the photoelectric conversion unit 21 and a charge amount of the holding portion 22 when a charge transfer to the holding portion 22 from the photoelectric conversion unit 21 is performed one time during the accumulation period of the photoelectric conversion unit 21. Capturing of one frame is started at time t1. The control signal OFD becomes high-level at the time t2, and an unneeded charge of the photoelectric conversion unit 21 is expelled. The control signal OFD becomes low-level at the time t3, and a charge accumulation of the photoelectric conversion unit 21 is started. From time t4 to t5, the first transfer switch 25 is ON, and the charge is transferred from the photoelectric conversion unit 21 to the holding portion 22. The charge accumulation time period of the photoelectric conversion unit 21 is a time period from the time t3 to the time t5. The control signal TX2 is made to be high-level for each pixel and charge is transferred sequentially from the holding portion 22 to the FD 23 after the time t5 which is the start of a next frame. The transfer of charge to the FD 23 completes at time t10. After the transfer of charge completes, the holding portion 22 is reset (not shown), and the charge which accumulated in the photoelectric conversion unit 21 during the transfer to the FD 23 is transferred from the photoelectric conversion unit 21 to the holding portion 22.

FIG. 10B is a view illustrating an example of a transition of a charge amount of the photoelectric conversion unit 21 and a charge amount of the holding portion 22 when a charge transfer to the holding portion 22 from the photoelectric conversion unit 21 is performed two times during the accumulation period of the photoelectric conversion unit 21. Capturing of the first frame is started at time t1. The control signal OFD becomes high-level at the time t2, and an unneeded charge of the photoelectric conversion portion is expelled. A first exposure (charge accumulation) in the photoelectric conversion portion is performed from the time t3 when the control signal OFD becomes the low level until time t4 when the first transfer to the holding portion 22 starts. From time t4 to time t5, the first transfer switch 25 for the transfer from the photoelectric conversion unit 21 to the holding portion 22 is ON, and the charge is transferred from the photoelectric conversion unit 21 to the holding portion 22 in this period. When the control signal TX1 becomes the low level at the time t5, the second exposure (charge accumulation) is performed by the photoelectric conversion unit 21. From time t6 to time t7, the first transfer switch for the transfer from the photoelectric conversion unit 21 to the holding portion 22 is once again ON, and charge is transferred from the photoelectric conversion unit 21 to the holding portion 22 again in this period. As a result, two times worth of charge transferred from the photoelectric conversion unit 21 is accumulated in the holding portion 22. The control signal TX2 is made to be high-level for each pixel and charge is transferred sequentially from the holding portion 22 to the FD 23 after the time t7. The transfer of charges finishes at time t12.

When a charge is transferred from the photoelectric conversion unit 21 to the holding portion 22 in the middle of transferring charge from the holding portion 22 to the FD 23, the charge amount of the holding portion 22 changes, and thus the charge cannot be transferred to an amplification portion 23 correctly. For this reason, it is necessary to perform the first transfer of charge from the photoelectric conversion unit 21 to the holding portion 22 for the next frame after the transfer of a charge from the holding portion 22 to the FD 23 finishes for a previous frame. Also, in a case where a transfer is performed a plurality of times, when an accumulation time period differs for each transfer, a situation where a first transfer is saturated and a second transfer is not saturated occurs, and linearity until saturation deteriorates. For this reason, a timing at which the control signal TX1 is made to be high-level is determined from the total accumulation time period such that the first accumulation time period (t5–t3) and the second accumulation time period (t7–t5) are the same. This the same in a case where the number of times of transfers is three times or more, and a period in which the control signal TX1 is made to be high-level is determined such that the accumulation time periods are evenly spaced apart.

Figure 11:
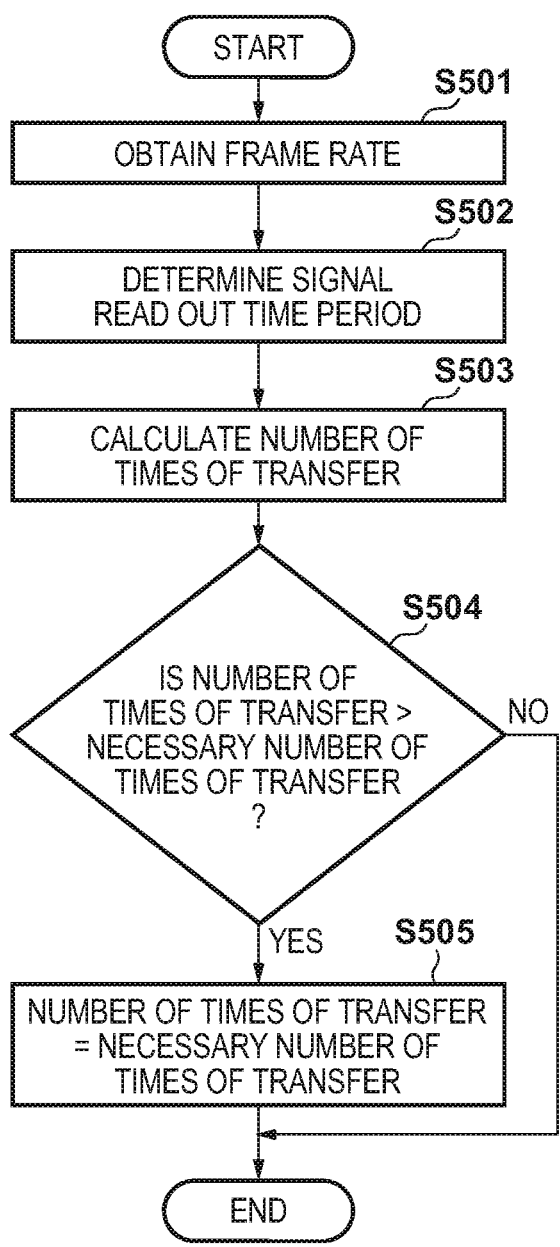
FIG. 11 is a flowchart illustrating a method of calculating a number of times of transfer in the fourth embodiment.

Next, description is given regarding a method of calculating the number of times of transfers. FIG. 11 is a flowchart illustrating a method of calculating the number of times of transfer. Firstly, information of the frame rate is obtained in step S501. A read out frame rate of the image sensor 1 is obtained in a case where the recording frame rate and the read out frame rate of the image sensor 1 are different.

Next, an image sensor signal read out time period is determined in step S502. A speed of a signal read out differs depending on the image sensor. Also, the signal read out time period differs depending on a state of the camera that a user set. For example, the signal read out time period becomes longer when the number of imaging pixels is set to be larger, and the signal read out time period becomes shorter when it is smaller. The signal read out speed is determined in accordance with the image sensor and a setting.

Next, the number of times of transfers is calculated in step S503. Equation (1) below is used to calculate the number of times of transfers.

$$\text{Number of times of transfer} = \text{round down}\{1/(\text{read out time period [s]} \times \text{frame rate [fps]})\} \quad (1)$$

For example, the number of times of transfer in a case where the time period required for a signal read out is 1/120 [s] is one time when the frame rate is higher than 60 fps, is two times when less than or equal to 60 fps and higher than 30 fps, and is three times when less than or equal to 30 fps and higher than 15 fps (less than 15 fps is omitted).

Next, the above described number of times of transfer is compared with the number of times of transfer necessary for the charge amount of the holding portion 22 to be reached (hereinafter referred to as the necessary number of times of transfer) in step S504. Equation (2) below is used to calculate the necessary number of times of transfer.

$$\text{Necessary number of times of transfer} = \text{round up (maximum charge amount that the holding portion can accumulate/maximum charge amount that the photoelectric conversion portion can accumulate)} \quad (2)$$

For example, the necessary number of times of transfer is three if the ratio between the maximum charge amounts that the photoelectric conversion unit 21 and the holding portion 22 can accumulate is 2:5. Specifically, if a transfer can be performed three times, it is possible to use accumulation capabilities of the holding portion 22 maximally.

If the number of times of transfer is larger than the necessary number of times of transfer in step S504, step S505 is advanced to, and the number of times of transfer is made to be the necessary number of times of transfer. In other words, because it is meaningless to increase the number of times of transfer to be greater than or equal to the necessary number of times of transfer, it is restricted to the necessary number of times of transfer. Meanwhile, if the number of times of transfer is less than or equal to the necessary number of times of transfer in step S504, the number of times of transfer calculated in step S503, unchanged, is made to be the number of times of transfer, and this routine finishes.

Note, in the present embodiment, the order of calculations of the number of times of transfers is not limited to the order described above. Also, calculation results may be stored beforehand as a table or the like. Also, while an example in which the number of times of transfer is made to be the maximum is described in the present embodiment, a fixed value restriction may be put on the number of times of transfer since noise properties become worse at a time of transfer and in a case where saturation is not necessary. For example, a comparison may be made with a fixed value rather than a comparison with the necessary number of times of transfer if the number of times of transfer is restricted to up to two times.

As described above, if the number of times of transfer is decided by the technique of the present embodiment, it becomes possible to set, in accordance with the frame rate, a number of times of transfer at which the capacity of the holding portion can be used with maximum effectiveness.

Fifth Embodiment

In the fourth embodiment, an example in which a number of times of a charge transfer is changed in accordance with an image sensor signal read out time period and a frame rate is illustrated. However, for a slow shutter, the number of times of transfer increases when the number of times of transfer is decided in accordance with the frame rate. For example, when the signal read out time period is 1/120 [s], the frame rate is 60 fps, and a shutter speed is 1/15 [s], a charge transfer in one frame is performed two times because the number of times of transfer is two times according to Equation (1). Meanwhile, with a slow shutter, since there is a charge accumulation of one time per four frames, charges are transferred eight times from the photoelectric conversion unit 21 to the holding portion 22 in relation to a charge accumulation of one time in the photoelectric conversion unit 21. Accordingly, the present embodiment gives an example in which the number of times of transfer is determined in accordance with a read out time period and a time period of frames for which accumulation is performed.

Figure 12:
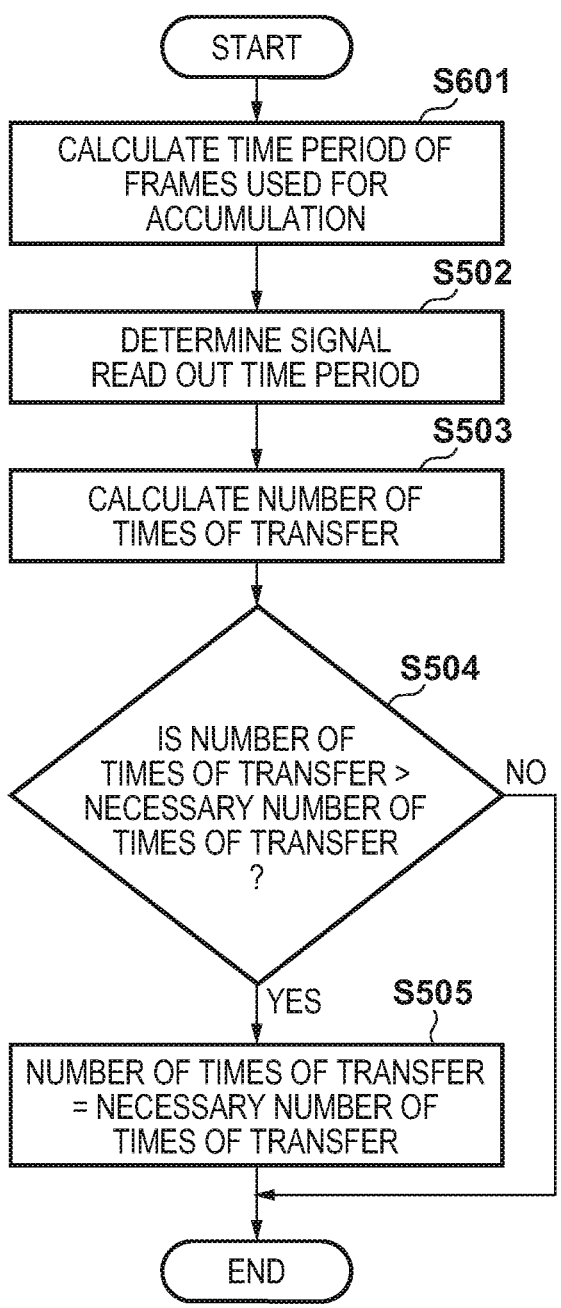
FIG. 12 is a flowchart illustrating a method of calculating a number of times of transfer in a fifth embodiment.

FIG. 12 is a flowchart illustrating a method of calculating the number of times of transfer in the present embodiment. Firstly, a time period of frames used for accumulation (hereinafter referred to as an accumulation frame time period) is calculated in step S601. The accumulation frame time period is calculated by using Equation (3) below.

Accumulation frame time period [s]=round up (accumulation time period [s]×frame rate [fps])/frame rate [fps]   (3)

When the frame rate is 60 fps for example, the accumulation frame time period is 1/60 [s] because a charge is accumulated in the photoelectric conversion unit 21 in one frame if the charge accumulation time period is less than or equal to 1/60 [s], and if the charge accumulation time period is greater than 1/60 [s] and less than or equal to 1/30 the accumulation frame time period becomes 1/30 [s] because charge is accumulated in the photoelectric conversion unit 21 in 2 frames.

Next, the signal read out time period is determined similarly to in the fourth embodiment in step S502 and the number of times of a charge transfer is calculated in step S503. Equation (4) below is used to calculate the number of times of transfer.

Number of times of transfer=round down (accumulation frame time period [s]/read out time period [s])   (4)

However, transfer is set to one time in a case where the accumulation frame time period is shorter than the signal read out time period.

Next, the necessary number of times of transfer is compared with the number of times of transfer similarly to the fourth embodiment in step S504. Then, if the number of times of transfer is larger than the necessary number of times of transfer, step S505 is advanced to, and the number of times of transfer is made to be the necessary number of times of transfer. Meanwhile, if the number of times of transfer is less than or equal to the necessary number of times of transfer in step S504, the number of times of transfer calculated in step S503, unchanged, is made to be the number of times of transfer, and this routine finishes.

Note, in the present embodiment, the order of calculations of the number of times of transfers is not limited to the order described above. Also, the calculation result may be stored beforehand as a table or the like. Also, while an example in which the number of times of transfer is made to be the maximum is described in the present embodiment, a fixed value restriction may be put on the number of times of transfer since noise properties become worse at a time of transfer and in a case where saturation is not necessary. For example, a comparison may be made with a fixed value rather than a comparison with the necessary number of times of transfer if the number of times of transfer is restricted to up to two times.

As described above, unnecessarily increasing the number of times of transfer is prevented at the time of a slow shutter because a number of times of transfer according to the accumulation frame number can be set if the number of times of transfer is determined by the method of the present embodiment.

Sixth Embodiment

Examples in which the number of times of transfer is calculated on the basis of frame rate are illustrated in the fourth and fifth embodiments. However, it is possible to increase the number of times of transfer according to a relationship of the charge accumulation time period of the photoelectric conversion unit 21 (shutter speed), the frame rate, and the signal read out time period. The present embodiment gives an example in which the number of times of transfer is changed in accordance with the charge accumulation time period, the frame rate, and the signal read out time period.

Figure 13:
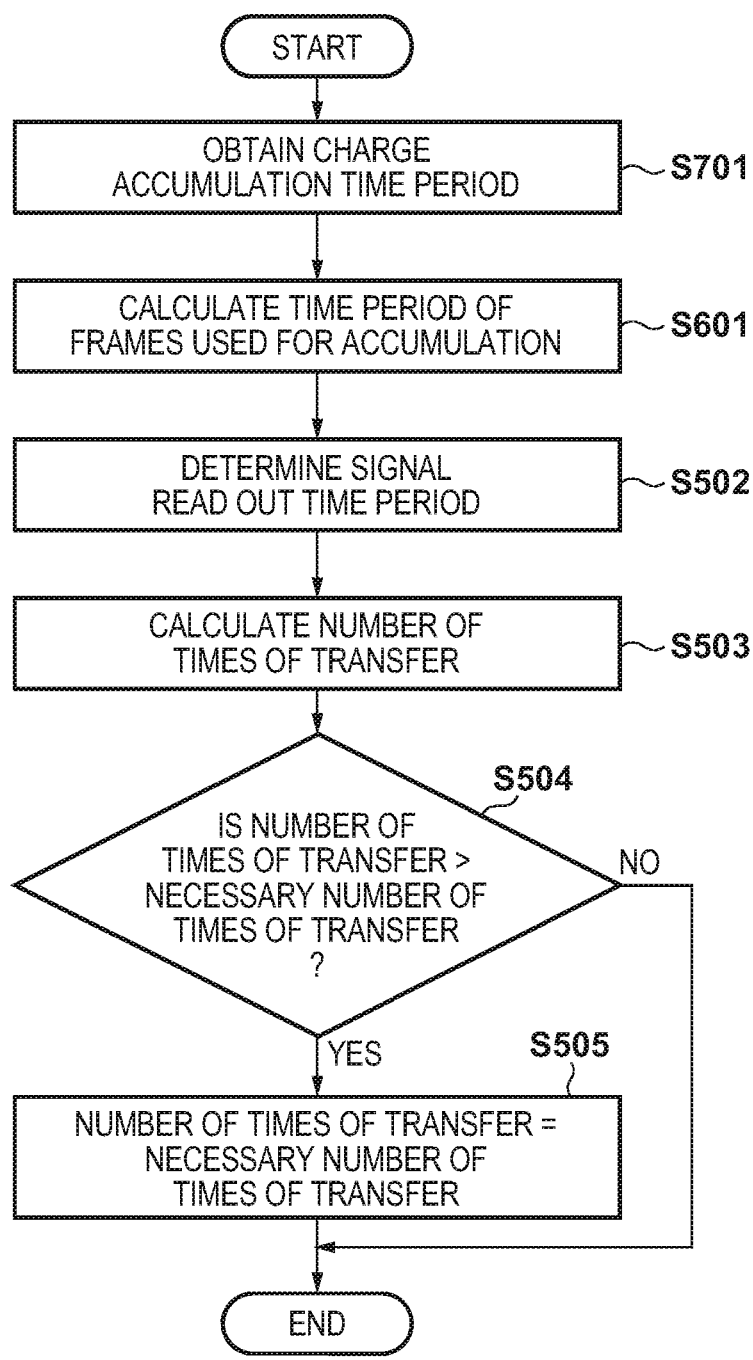
FIG. 13 is a flowchart illustrating a method of calculating a number of times of transfer in a sixth embodiment.

FIG. 13 is a flowchart illustrating a method of calculating the number of times of transfer in the present embodiment. Firstly, a charge accumulation time period (shutter speed) is obtained in step S701. The charge accumulation time period becomes a charge accumulation time period that the user desires if an exposure mode is a manual or a Tv mode (shutter speed priority mode), and the charge accumulation time period is determined in accordance with the brightness if it is another mode in which the shutter speed is changed automatically. The method of determining the charge accumulation time period may be performed by various publicly known methods, but limitation is not particularly made to this.

Next, similarly to in the fifth embodiment, the time period of frames used for charge accumulation is calculated in step S601, the signal read out time period is determined in step S502, and the number of times of charge transfer is calculated in step S503.

Figure 14:
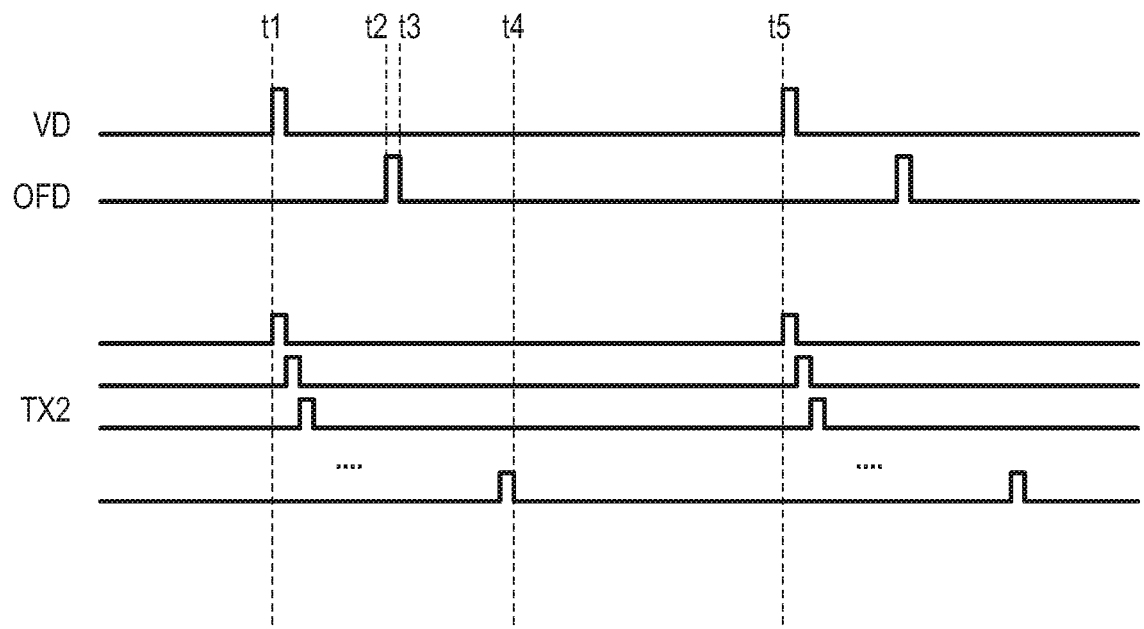
FIG. 14 is a view illustrating timing of a read out and accumulation in a sixth embodiment.

Description is given using FIG. 14 in relation to the calculation of the number of times of transfer. FIG. 14 is a view illustrating a timing of a signal read out and a charge accumulation. Capturing of one frame is started at time t1. Simultaneously, a signal read out of each line is started by the control signal TX2 becoming high-level. At time t2 the control signal OFD becomes high-level, and, after an unneeded charge of the photoelectric conversion unit 21 is expelled, the control signal OFD enters a low level at time t3, and accumulation of the signal charge is started. The timing of the time t2 and the time t3 changes in accordance with the charge accumulation time period. A frame in which the control signal OFD does not enter high-level arises because expulsion of unneeded charge is not performed in a case of a slow shutter. At the time t4, the transfer of a charge from the holding portion 22 to the FD 23 of each line finishes and a transfer of charge from the photoelectric conversion unit 21 to the holding portion 22 becomes possible. At the time t5, a vertical synchronizing signal VD once again becomes high-level, a read out of one frame finishes, and the next frame is started.

The charge accumulation time period is the time period from the time t3 to the time t5, the signal read out time period is the period from the time t1 to the time t4, and the accumulation frame time period is period from the time t1 to the time t5. For example, if the accumulation time period is $1/80$ [s], the read out time period is $1/120$ [s], and the frame rate is 60 fps, the following is true:

$$t5-t3=1/80 \text{ [s]} \quad (5)$$

$$t4-t1=1/120 \text{ [s]} \quad (6)$$

$$t5-t1=1/60 \text{ [s]} \quad (7)$$

A transfer of a charge from the photoelectric conversion unit 21 to the holding portion 22 is not possible from the time t3 at which the charge accumulation is started to the time t4 at which the signal read out finishes. This period is the shortest time period in which a charge is accumulated in the photoelectric conversion unit 21 (hereinafter referred to as a shortest time period of a transfer). For this reason, a value resulting from dividing the accumulation time period by the shortest time period of a transfer is the number of times of transfer.

When applied to the example described above, from Equation (5) and Equation (7):

$$t3-t1=(t5-t1)-(t5-t3)=1/60-1/80=1/240 \quad (8)$$

(t4−t3) which is the shortest time period of a transfer from Equation (6) and Equation (8) is $$t4-t3=(t4-t1)-(t3-t1)=1/120-1/240=1/240 \quad (9)$$

The number of times of transfer is three times because the value is the charge accumulation time period $1/80$ [s] is divided by $1/240$ [s]. When the accumulation time period is slightly longer than $1/80$ [s], a transfer of three times becomes impossible because (t4−t3) becomes longer. For this reason, it is necessary that the number of times of transfer be calculated by rounding down. From the above, the number of times of transfer is as in the following Equation (10).

Number of times of transfer=round down[accumulation time period/{read out time period−(accumulation frame time period−accumulation time period)}] (10)

In other words, the number of times of transfer is obtained by dividing the charge accumulation time period by a value that subtracts the time period of frames used for charge accumulation from the signal read out time period and further adding the charge accumulation time period. Note that, since there are cases in which the denominator of Equation (10) becomes too small depending on the charge accumulation time period, it is necessary to have certain restriction. For example, in a case in which the number of times of transfer is restricted to five times, in a case in which the charge accumulation time period is less than or equal to $1/5$ in the denominator of Equation (10), the charge accumulation time period is made to be $1/5$. Also, in a case in which the charge accumulation time period is larger than $1/5$, the number of times of transfer is calculated according to Equation (10). In this way, the number of times of transfer can be restricted.

After the number of times of transfer is calculated, in step S504, similarly to in the fifth embodiment, the number of times of transfer and the necessary number of times of transfer are compared and if the number of times of transfer is greater than the necessary number of times of transfer, step S505 is advanced to, and the number of times of transfer is made to be the necessary number of times of transfer. Meanwhile, if the number of times of transfer is less than or equal to the necessary number of times of transfer in step S504, the number of times of transfer calculated in step S503, unchanged, is made to be the number of times of transfer, and this routine finishes.

Note, in the present embodiment, the order of calculations of the number of times of transfers is not limited to the order described above. Also, the calculation result may be stored beforehand as a table or the like. Also, while an example in which the number of times of transfer is made to be the maximum is described in the present embodiment, a fixed value restriction may be put on the number of times of transfer since noise properties become worse at a time of transfer and in a case where saturation is not necessary. For example, a comparison may be made with a fixed value rather than a comparison with the necessary number of times of transfer if the number of times of transfer is restricted to up to two times.

Also, although in the present embodiment the number of times of transfer is calculated by using the time period of frames used for accumulation similarly to in the fifth embodiment, the number of times of transfer may be calculated by using the frame rate similarly to in the fourth embodiment. In this case, a time period of frames used for accumulation may be changed to a time period of one frame.

As described above, because it is possible to set the number of times of transfer according to the charge accumulation time period if the number of times of transfer is determined by the technique of the present embodiment, it is possible to increase the number of times of transfer depending on the charge accumulation time period even with the same signal read out time period and frame rate. Also, it is possible to set, in accordance with the frame rate, a number of times of transfer at which the capacity of the holding portion can be used with maximum effectiveness.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-166010, filed Aug. 26, 2016, which is hereby incorporated by reference herein in its entirety.

What is claimed is:
1. An image capturing apparatus comprising:
(1) an image sensor in which a plurality of pixels are arranged two-dimensionally, wherein each of the pixels includes:
  (a) a photoelectric conversion device that converts incident light into a charge,
  (b) a holding device that holds a charge obtained by the photoelectric conversion device,
  (c) an amplification device that outputs a signal based on a charge outputted from the holding device,
  (d) a first transfer switch that transfers the charge from the photoelectric conversion device to the holding device, and
  (e) a second transfer switch that transfers the charge from the holding device to the amplification device; and
(2) a controller that controls such that the first transfer switch is turned on a number of times in relation to the second transfer switch being turned on one time,
wherein when the image sensor outputs a plurality of different color signals, the controller controls the number of times to be smaller in a case where a condition resulting in greater image degradation with respect to color balance caused by an occurrence of a flash is set than in a case where a condition resulting in lesser image degradation with respect to color balance caused by the occurrence of the flash is set.

2. The image capturing apparatus according to claim 1, wherein the number of times is set based on a charge amount that can be accumulated in the holding device and a charge amount that can be accumulated in the photoelectric conversion device.

3. A method of controlling an image capturing apparatus including an image sensor in which a plurality of pixels are arranged two-dimensionally, wherein each of the pixels includes (a) a photoelectric conversion device that converts incident light into a charge, (b) a holding device that holds a charge obtained by the photoelectric conversion device, (c) an amplification device that outputs a signal based on a charge outputted from the holding device, (d) a first transfer switch that transfers the charge from the photoelectric conversion device to the holding device, and (e) a second transfer switch that transfers the charge from the holding device to the amplification device, the method comprising:
controlling such that the first transfer switch is turned on a number of times in relation to the second transfer switch being turned on one time,
wherein when the image sensor outputs a plurality of different color signals, the controlling controls the number of times to be smaller in a case where a condition resulting in greater image degradation with respect to color balance caused by an occurrence of a flash is set than in a case where a condition resulting in lesser image degradation with respect to color balance caused by the occurrence of the flash is set.

* * * * *